United States Patent [19]

Bailey

[11] Patent Number: 5,242,046
[45] Date of Patent: Sep. 7, 1993

[54] CLEAN SURFACE CONVEYOR WITH FLEXIBLE SHEATH

[75] Inventor: Christian E. Bailey, Port Deposit, Md.

[73] Assignee: W. L. Gore & Associates, Inc., Newark, Del.

[21] Appl. No.: 915,157

[22] Filed: Jul. 15, 1992

[51] Int. Cl.⁵ ............................................. B65G 25/00
[52] U.S. Cl. ................................ 198/774.1; 198/775; 198/776; 454/49; 454/66
[58] Field of Search ............... 198/774.1, 774.2, 774.3, 198/774.4, 775, 776, 630, 773; 414/525.9; 454/49, 66

[56] References Cited

U.S. PATENT DOCUMENTS

| | | | |
|---|---|---|---|
| 1,587,750 | 6/1926 | Christensen. | |
| 2,957,573 | 10/1960 | Eyster. | |
| 3,871,534 | 3/1975 | Bursk | 198/776 X |
| 4,228,892 | 10/1980 | Gunnergaard et al. | 198/832 |
| 4,714,153 | 12/1987 | Bischofberger et al. | 198/776 X |
| 4,832,168 | 5/1989 | Farmer | 198/777 X |

FOREIGN PATENT DOCUMENTS 1206372 9/1964 Fed. Rep. of Germany.
3829305 8/1988 Fed. Rep. of Germany.

*Primary Examiner*—Cheryl L. Gastineau
*Attorney, Agent, or Firm*—Dena Meyer Weker

[57] ABSTRACT

A mechanical conveyor system is provided with an exposed flexible membrane surface for use in clean room environments. The conveyor system may be one of varied subassemblies which transfer articles on the conveyor by small orbital motions. The exposed flexible sheath is preferably a membrane which is permeable to air. The system may provide for air flow through the membrane to ensure a clean environment. A preferred flexible membrane is expanded polytetrafluoroethylene.

11 Claims, 12 Drawing Sheets

FIG. 5a
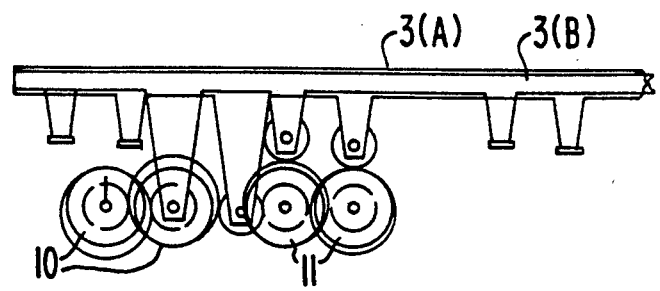
FIG. 5b
FIG. 5c
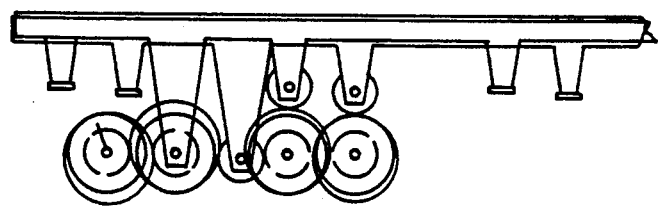
FIG. 5d
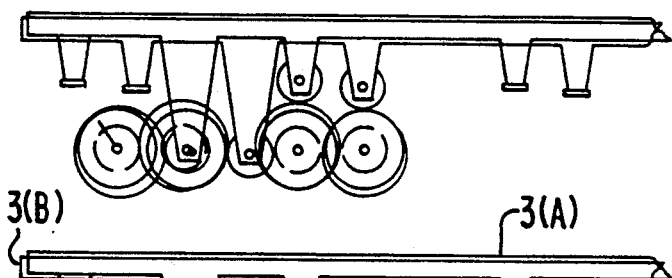
FIG. 5e
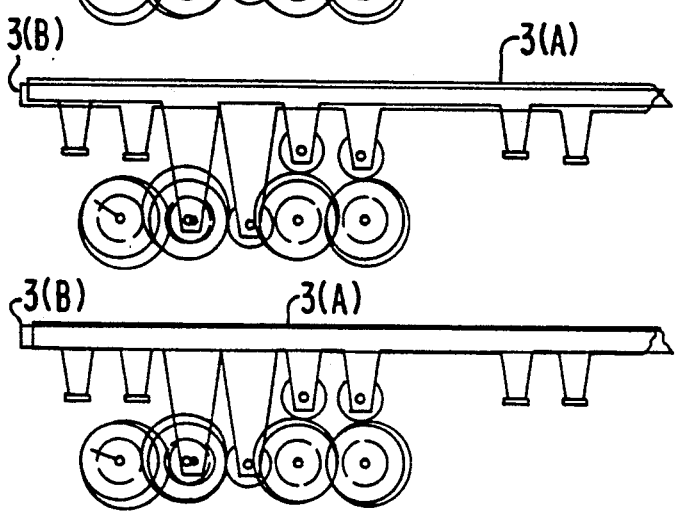
FIG. 5f
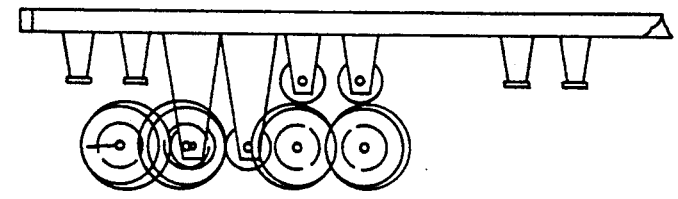
FIG. 5g
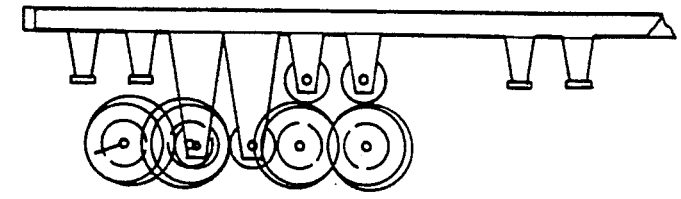

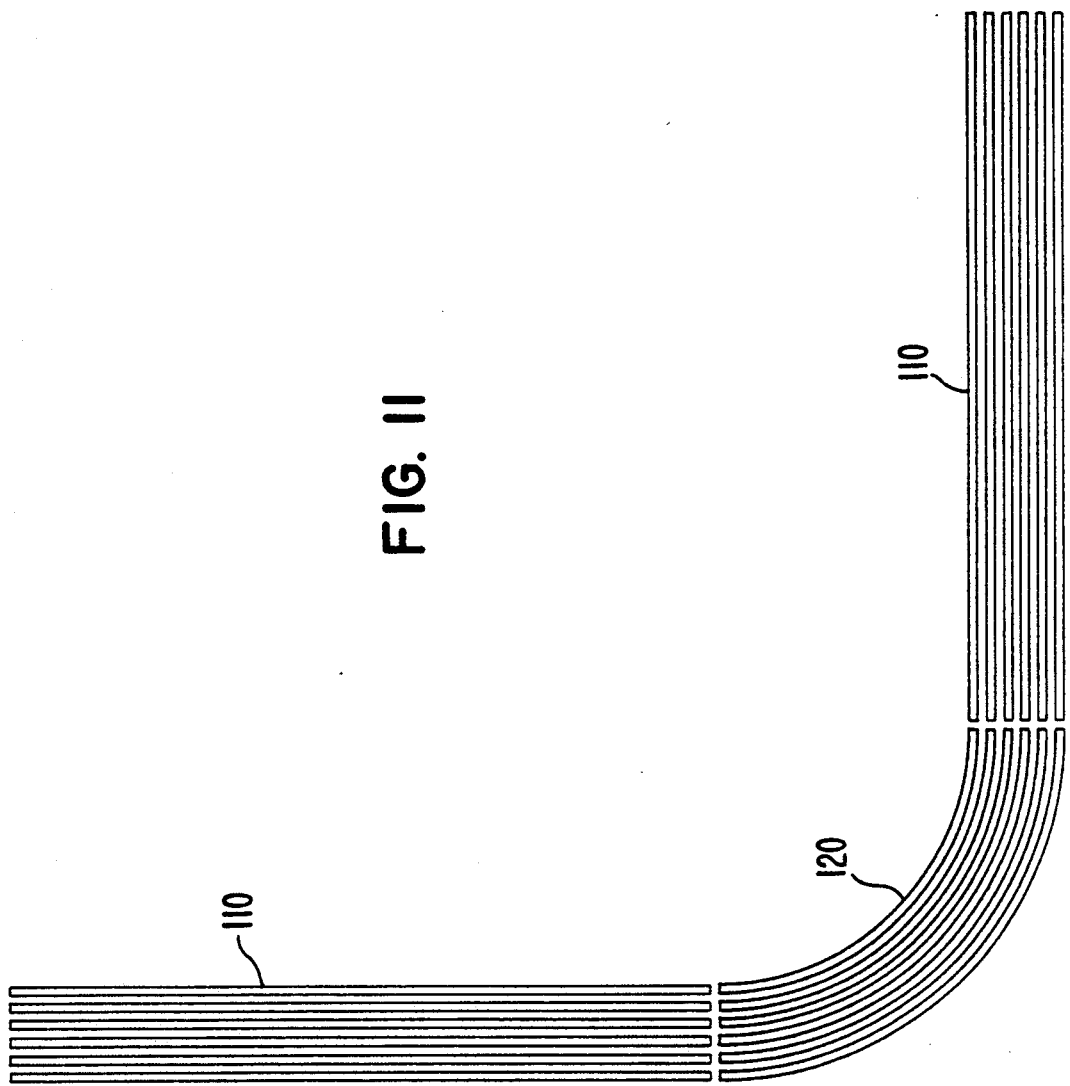

CLEAN SURFACE CONVEYOR WITH FLEXIBLE SHEATH

FIELD OF THE INVENTION

This invention relates to a mechanical conveyor system equipped with an exposed flexible sheath surface for use in clean room environments. The conveyor system may be one of varied subassemblies which transfer articles on the conveyor by small orbital motions. The exposed flexible sheath is preferably a membrane permeable to air. The system may provide for airflow through the membrane to ensure a clean environment. A preferred flexible membrane is expanded polytetrafluoroethylene.

BACKGROUND OF THE INVENTION

Means of conveying articles in clean rooms include ordinary conveyor belts with some of the moving parts shielded or covered with exhaust hoods to draw particles away, and expensive specialized robotic arms using exotic nonparticulating surfaces on moving parts that are subject to friction.

There are many types of conveyors. Roller conveyors use rotating wheels or cylinders to support the conveyed articles. These conveyors are typically stationary. A conveyor belt uses a flat or trough shaped endless belt cycling around pulleys at either end. Drag conveyors use a stationary tray or trough along which pushers or bars travel, dragging conveyed articles with them. Vibratory conveyors rapidly move upward and forward, then downward and backward, such that conveyed articles are thrown toward the discharge end in many tiny steps. Variations of these types use gravity or applied mechanical power in different ways.

A walking beam conveyor typically comprises two subassemblies of long bars or beams aligned parallel to the direction of conveyance. One subassembly, called the stationary beam, comprising at least two bars of equal length and height spaced side by side, supports the conveyed articles most of the time. A second subassembly, called the walking beam, also comprising at least two bars of equal length and height spaced side by side relatively more closely than those of the stationary beam, is positioned in between the bars of the stationary beam. This second subassembly moves up between the bars of the stationary beam, lifting the conveyed article slightly above the stationary beam. The second subassembly then moves forward, advancing the article, and then lowers it again to the stationary beam. The second subassembly then moves down below the level of the stationary beam, where it is not touching the conveyed article, and moves back to its original starting position. The conveyed article advances along the conveyor in several steps, resting on the stationary beam between steps.

Walking beam conveyor assemblies are often utilized where article movement between discreet locations at long time intervals is desired, as on a slow production line with several work stations. Where uneven starting and stopping motion is undesirable, the walking beam drive mechanism may be modified with gear motors having gradual starting and stopping characteristics, or cranks which pause at the points in their travel where the tangential component of motion vanishes, or hydraulic cylinders having special flow controls, so as to make the required starting and stopping less jarring to the conveyed article.

Walking beam conveyors are sometimes applied to contamination sensitive applications, for example in food processing where lubricants and abraded metal particles from the mechanism must be prevented from contaminating the food articles being conveyed. The moving linkages required to support the walking beam and its motion are located beyond the used zone of the conveyor if article travel from one end of the conveyor to the other is not required and if special constructions are used. Sealed bearings and stainless steel mechanical parts may also be used. These measures are somewhat successful at reducing contamination, but with corresponding compromises in expense and utility.

There is a need for a conveyor system that can be used in clean room environments that is relatively inexpensive to construct and is easy to use without requiring special exhaust hoods and enclosures or expensive, exotic, low particulating surfaces and which provides more control over particulation.

SUMMARY OF THE INVENTION

A mechanical conveyor system is provided comprising a plurality of subassemblies which are interleaved to provide multiple support points, a supporting framework to hold the subassemblies intact, said framework sealed within an enclosure, means for providing motion to the subassembly, a power source for operating the motion means and a flexible sheath bonded to the subassemblies at the multiple support points.

The subassemblies may comprise components of a standard walking beam conveyor having a stationary subassembly and a moving subassembly which carries the article to its destination. Alternatively, a plurality of moving subassemblies may be provided which are interconnected so that they share the movement within a predetermined time sequence. Subassemblies having different shapes and providing for circular motion may also be provided. Multiple subassemblies may also be combined into one conveyor system so that different functions are performed.

Means for providing motion to the subassemblies include cams and followers, cranks, hydraulic or pneumatic cylinders, solenoid coils, servomotors, and clutches and levers.

The flexible sheath to be used in clean room environments must be nonparticulating, sterile, cleanable and nontoxic. A desired flexible sheath is a membrane that is air permeable, microporous, and is resistant over a wide range of temperatures and chemicals. A preferred flexible sheath membrane is expanded polytetrafluoroethylene. The expanded polytetrafluoroethylene may also be coated or filled with other substances such as urethane and silicone rubber. The flexible sheath membrane may also be reinforced at points where the membrane is bonded to the subassembly to make more abrasion resistant.

A suction fan may optionally be provided to the interior of the conveyor device that draws air inward through the flexible sheath membrane. Alternatively, a blower may optionally be provided to pressurize the interior of the conveyor device that forces air outward through the flexible sheath membrane.

BRIEF DESCRIPTION OF THE DRAWINGS

FIG. 11 is a top view of three conveyors assembled comprising a curved section positioned between two straight sections.

DETAILED DESCRIPTION OF THE PREFERRED EMBODIMENTS

A mechanical conveyor system is provided comprising a plurality of subassemblies which are interleaved to provide multiple support points to which a flexible sheath is bonded. The conveyor system is also provided with a supporting framework to hold the subassemblies intact and a sealable enclosure which contains the framework and subassemblies. A means for providing motion to the subassembly and a power source for operating the motion means are also provided.

The simplest subassembly suitable for this type of conveyor system includes the standard walking beam conveyor comprising a stationary subassembly and a moving subassembly which carries the article to its destination. A flexible sheath is bonded at multiple support points along the upper surface of the subassemblies.

In this embodiment, the moving subassembly exhibits orbiting motions which cause the article atop the sheath to be conveyed along the conveyor system. The actual motion of the moving subassembly includes a rising movement to carry the article, a separate forward movement to advance the article, a lowering movement in which the article is supported by the stationary subassembly and a backward movement before rising to carry the article once again. These movements of the subassembly cause the attached sheath to flex causing the article to likewise move in the desired direction. The motion of the subassembly is of much shorter distance than the total distance over which the article will be conveyed. The article being conveyed travels along the length of the conveyor whereas the flexible membrane and subassemblies exhibit only repetitive small motions.

Figure 1:
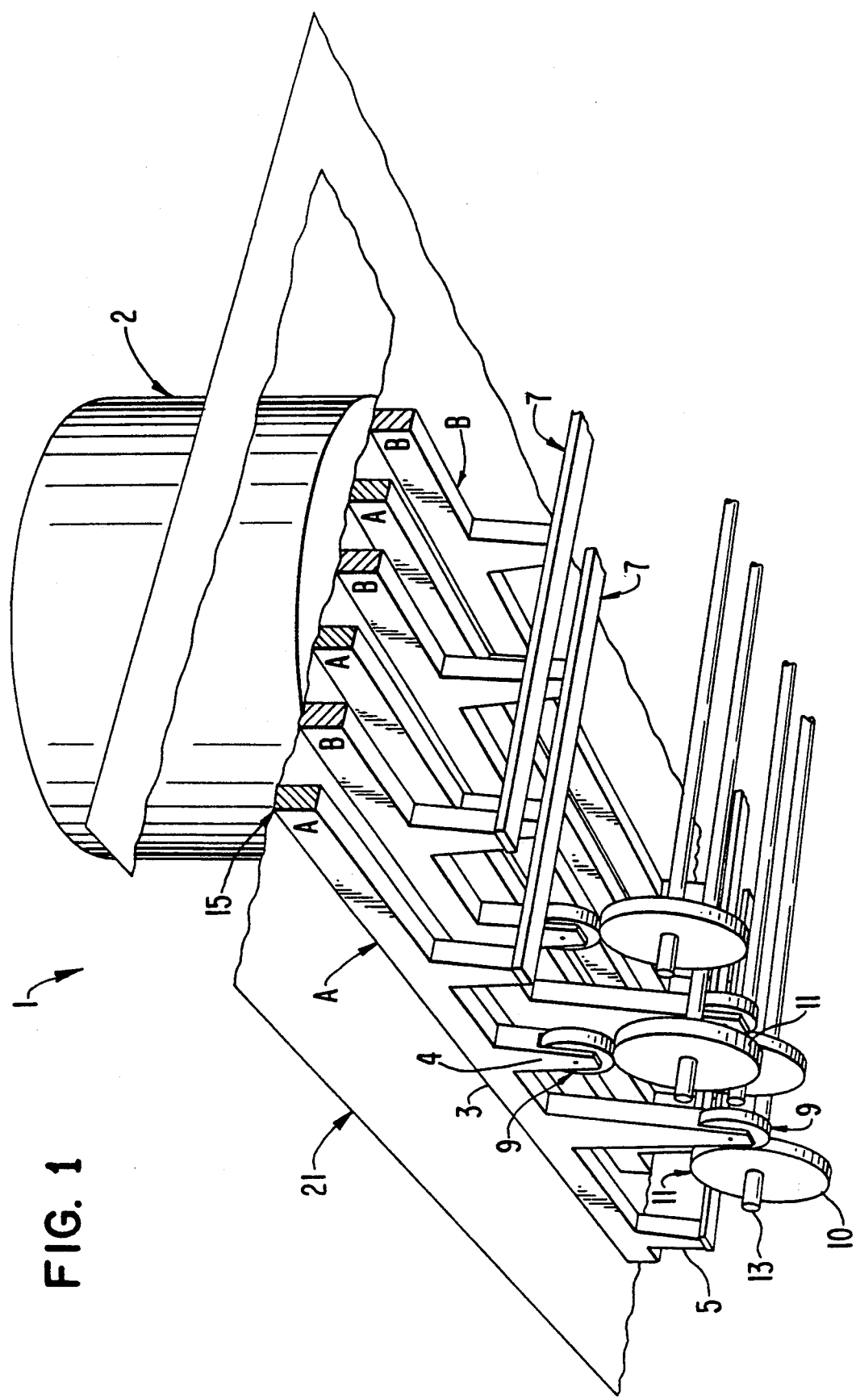
FIG. 1 is a partial perspective of one embodiment of the present invention (supporting framework and enclosure not shown).

A second and more preferred embodiment includes a conveyor system having at least two subassemblies which both move. This embodiment is best understood by reference to the accompanying drawings. FIG. 1 is a partial perspective view of the mechanical conveyor system having two subassemblies, A and B both of which move. Each subassembly comprises a plurality of mutually parallel bars 3 (FIG. 1 shows three bars per subassembly) interconnected by a plurality of parallel crossbars 7 via extension supports protruding from the parallel crossbars. The parallel bars 3 of the subassemblies are interleaved so that they alternate in position. At multiple points along these bars are support points 15 to which the sheath 21, described below, is attached.

Figure 2:
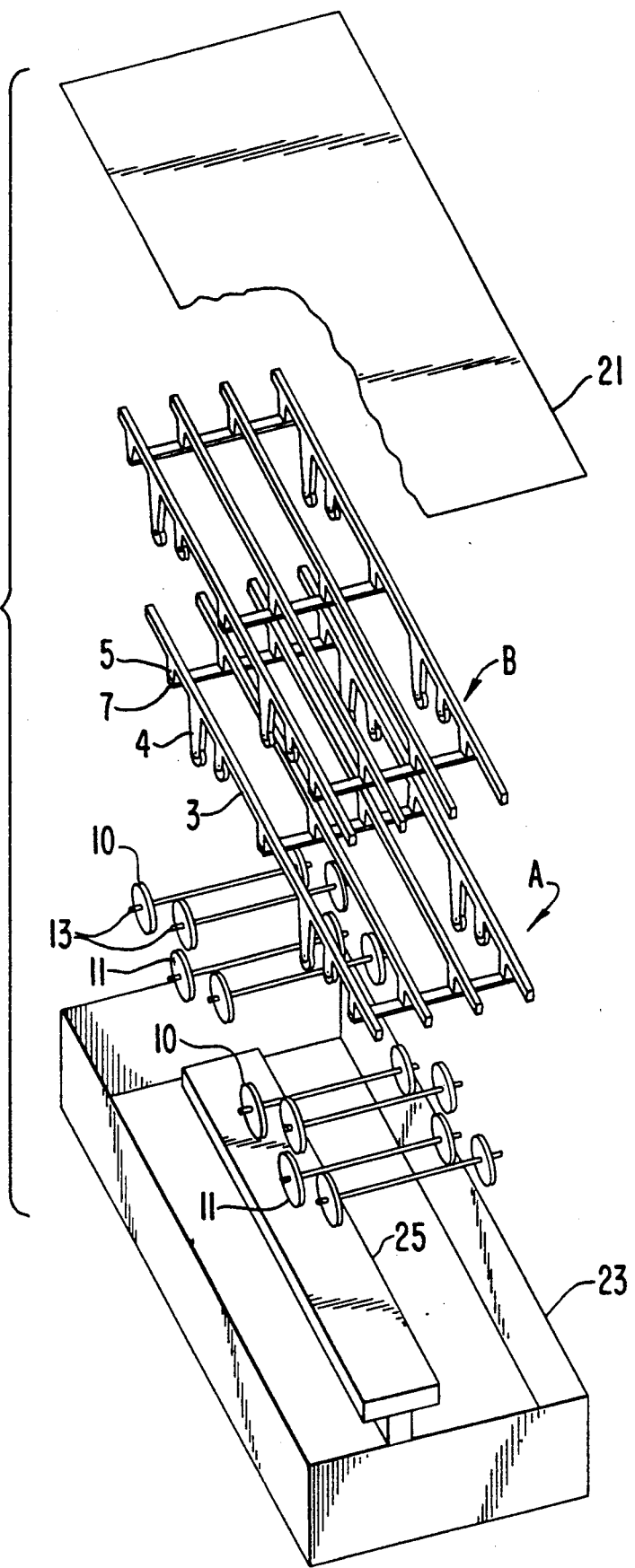
FIG. 2 is an exploded perspective of the same embodiment shown in FIG. 1 with supporting framework and enclosure.

Also protruding from the parallel bars 3 are supports 4 for the cam followers 9. FIG. 1 also shows the camshafts 13 for both the horizontal 10 and vertical cams 11. The horizontal cam 10 and vertical cam 11 identified in FIG. 1 are one of four pairs of cams belonging to subassembly A. Likewise subassembly B has four pairs of horizontal and vertical cams. FIG. 2 is an exploded perspective of the same embodiment shown in FIG. 1 where the pairs of horizontal cams 10 and vertical cams 11 are shown for each subassembly.

Also shown in FIG. 2 is the supporting framework 25 which holds the camshafts and the cover 23 which encloses the entire subassembly.

Figure 4:
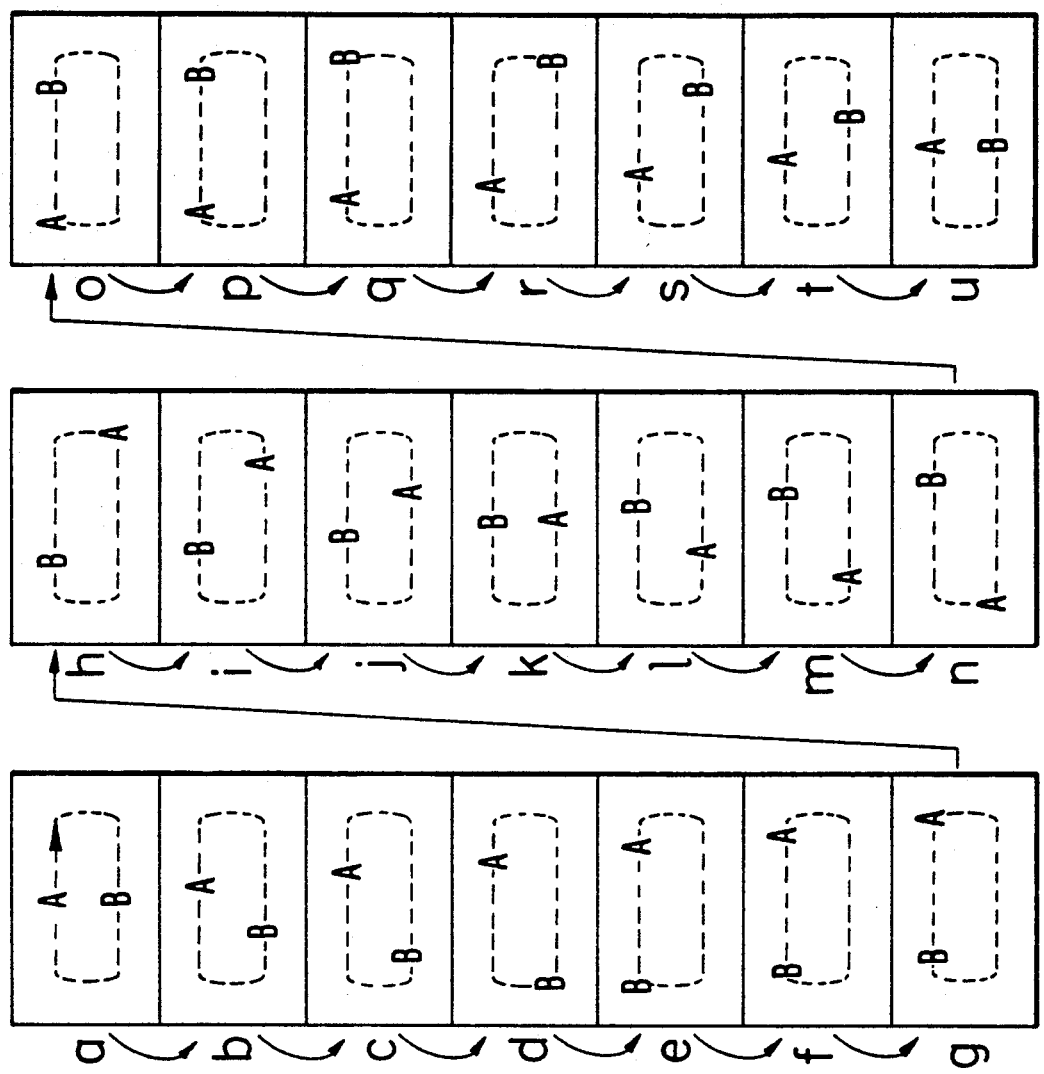
FIGS. 4 (a-u) are position diagrams for the motion travelled of the embodiment shown in FIG. 1 showing movement of the conveyor parts.
Figure 5H:
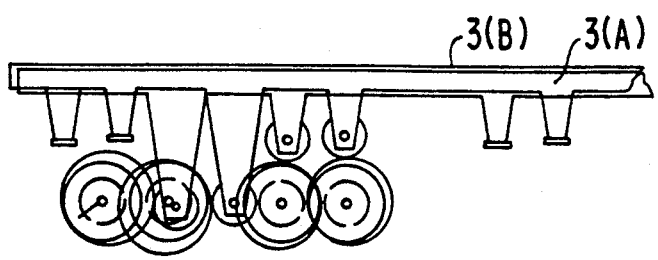
FIGS. 5 (a-u) are a series of cutaway side views corresponding to the position diagram of FIG. 4.
Figure 5I:
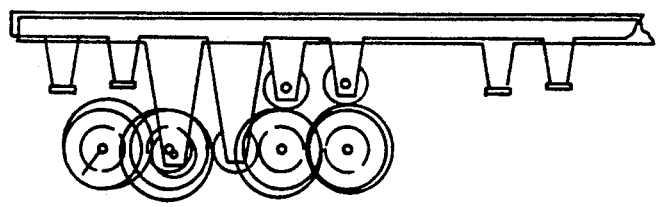
Figure 5J:
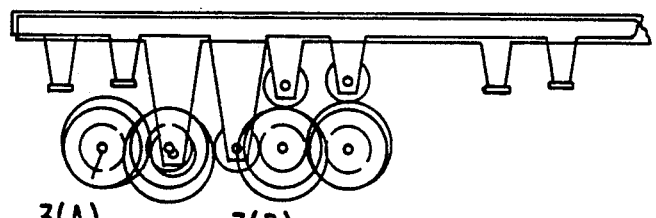
Figure 5K:
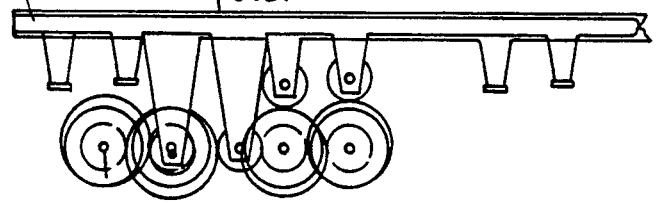
Figure 5L:
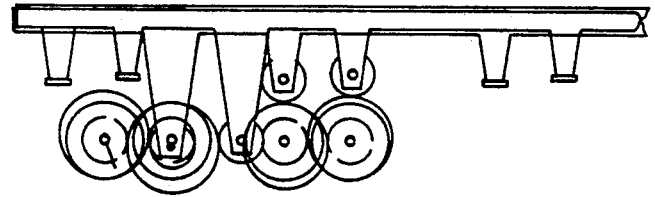
Figure 5M:
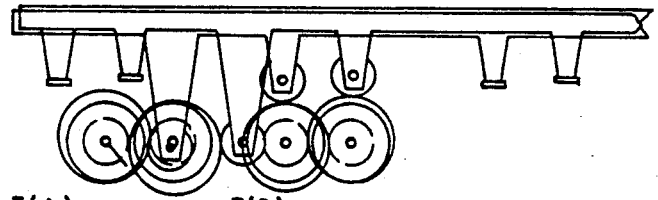

In this embodiment, subassemblies A and B move with identical motion but are 180° out of phase in the sequences of motion. FIGS. 4 (a-u) are diagrams of the sequential positions of subassemblies A and B as they move through the steps. FIGS. 5 (a-u) show a series of partial cutaway side views of the subassemblies that correspond to the positions shown in FIG. 4. FIG. 6 shows a timing diagram of the subassemblies movement divided among 20 equally timed intervals.

Thus in FIG. 4a, subassembly A is raised to its upper position and is moving slowly forward at uniform velocity. As can be seen in FIG. 5a, bar 3(A) of subassembly A is in the upper position relative to bar 3(B) of subassembly B. Also shown in FIG. 5a are the horizontal 10 and vertical cams 11 associated with each subassembly. The outer profile of each shows the position of each cam during the sequence of motion. All of the cams for subassembly A rotate together at uniform speed. All of the cams associated with subassembly B also rotate together at a uniform speed but at a half turn or 180° different phase relative to subassembly A. The cam at the far left of each figure is marked with a radial pointer line to visualize rotation. As such, FIG. 5a shows the horizontal cam 10 for subassembly A midway through its advancing incline. Vertical cam 11 of subassembly A is in the middle of its raised segment. At this point, subassembly A is supporting the conveyed article and moving it forward. Subassembly B, at this time, is in its lowered position, moving backward relatively more rapidly than A. Subassembly B at points 4a and 5a has moved halfway from the foremost position to the rearmost. Horizontal cam of subassembly B is midway through its retreating incline and vertical cam of subassembly B is in the middle of its lowered segment.

At the position corresponding to FIG. 4d, subassembly A has moved almost all the way to its foremost position still raised. In FIG. 5d, bar 3 of subassembly A is shown above, and jutting forward relative to bar 3 of subassembly B. Subassembly B, moving more rapidly, has moved completely to the rearmost extreme.

At position 4e and as shown in FIG. 5e, subassembly B has been raised to contact the conveyed article. In FIG. 5e, the two bars 3 of subassemblies A and B are at the same height. The vertical cam for subassembly A is almost at the end of its raised segment, while vertical cam of subassembly B is at the beginning of its raised segment. Horizontal cam A is nearing its greatest radius, while horizontal cam B is near its smallest radius.

At positions corresponding to 4e through 4g, both subassemblies are supporting the conveyed article and moving it forward, subassembly A being considerably ahead of subassembly B. The vertical cam of both subassembly A and subassembly B are in their raised segments, respectively near their ending and beginning. Horizontal cams for both subassemblies A and B are on advancing inclines, again respectively near the end and beginning. At the position corresponding to 4g subassembly A has reached the extreme forward position.

At the position corresponding to 4h, subassembly A has dropped into its lower position, such that subassembly B only is supporting and advancing the conveyed article. Vertical cam for subassembly A is at a transition point. Subassembly A then begins moving rapidly rearward with horizontal cam of subassembly A on a retreating incline while subassembly B continues to move slowly forward.

At the position corresponding to 4k, subassembly A has moved halfway back to the rearmost extreme by the same time that subassembly B has moved halfway forward to the foremost extreme. This position is halfway around the motion sequence from the point at which the sequences began at the position corresponding to 4a. Thus FIG. 5k shows the same positioning as FIG. 5a, except that A and B have traded places, with subassembly B raised to its upper position with bar 3 higher relative to bar 3 of subassembly A. Likewise, vertical and horizontal cams of subassembly B are respectively in the middle of their raised and advancing inclined sections. Vertical and horizontal cams of subassembly A are in the middle of the lowered and retreating inclined sections.

Subassembly A then continues to move rapidly backward, reaching its rearmost extreme (position 4n, 5n) and rising to meet the conveyed article a short time before subassembly B has reached its foremost extreme. During this sequence, both subassemblies are again supporting the conveyed article and advancing it, however this time subassembly B is considerably ahead of subassembly A. This is the other of two periods when both vertical cams are in raised segments. At the position corresponding to 4q, subassembly B reaches its foremost position and drops at FIGS. 4r and 5r to begin its rapid retreat. Subassembly A continues to advance during this time. At the point where subassembly A has advanced halfway in its upper position and subassembly B has retreated halfway, the cycle is complete and the subassemblies are again at the position corresponding to 4a and 5a to repeat the cycle again. As in the beginning of the cycle, horizontal cam of subassembly A is in the middle of its advancing incline, vertical cam of subassembly A is in the middle of its raised segment, horizontal cam of subassembly B is in the middle of its retreating incline and vertical cam of subassembly B is in the middle of its lowered segment.

Figure 3:
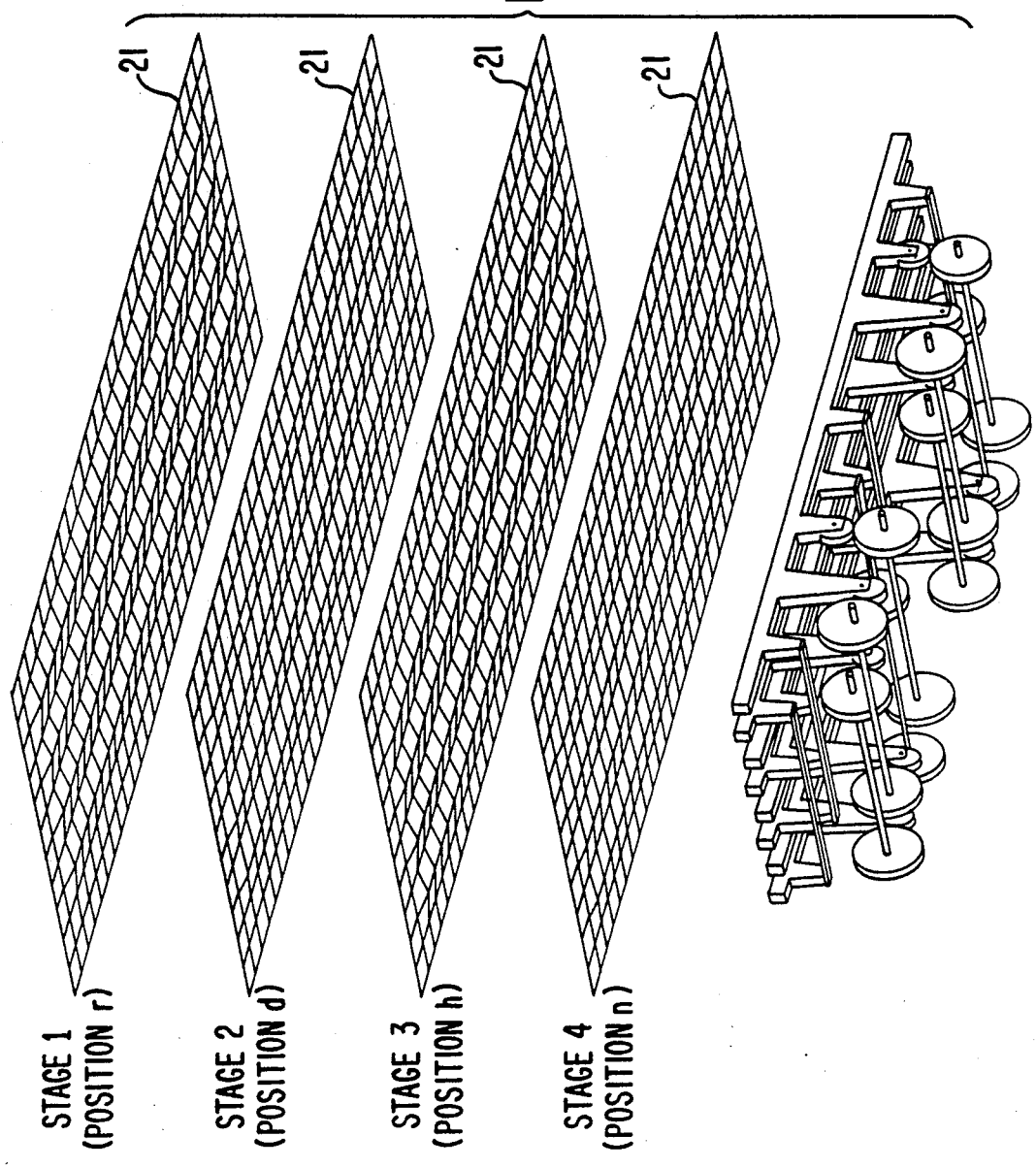
FIG. 3 is a partially exploded perspective of the embodiment of FIG. 1 showing sheath movement for motion travelled.

Simultaneous with the movements of subassemblies A and B, the sheath membrane 21 bonded to the parallel bars 3 all along the top surface, likewise flexes. FIG. 3 shows a partially exploded view of the embodiment shown in FIG. 1 in which the sheath 21 is shown flexed at different stages. Stage 1 of FIG. 3 shows the flexing of the flexible sheath 21 at the position corresponding to 4r and 5r described above. At stage 2, the flexible sheath is flexed at the position corresponding to 4d and 5d of FIGS. 4 and 5. At stage 3, the sheath 21 is shown as flexed during the sequence where subassembly A has begun its rearward movement and corresponds to FIG. 4h and FIG. 5h.

Figure 5N:
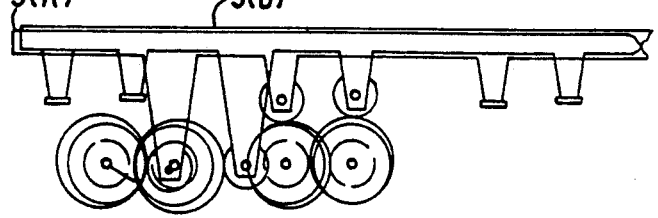
Figure 5O:
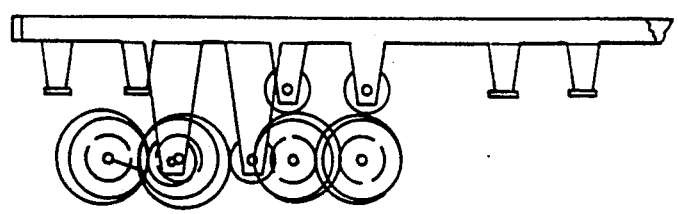
Figure 5P:
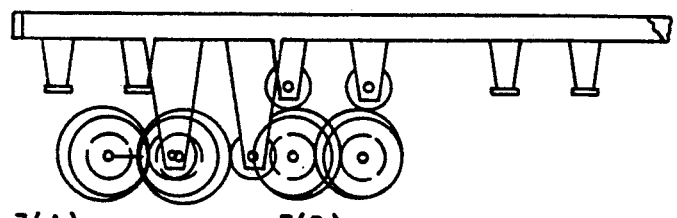
Figure 5Q:
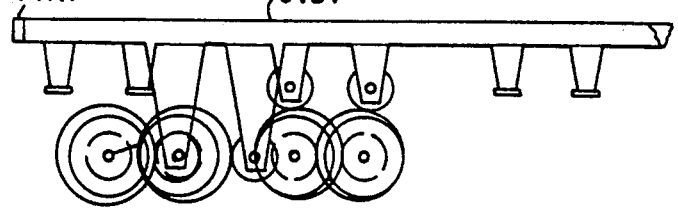
Figure 5R:
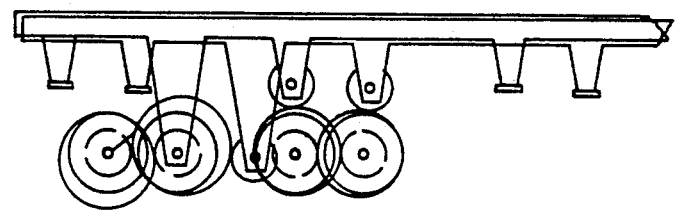
Figure 5S:
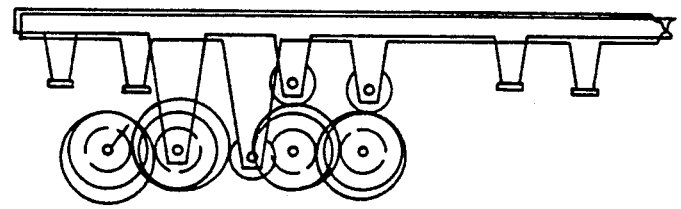
Figure 5T:
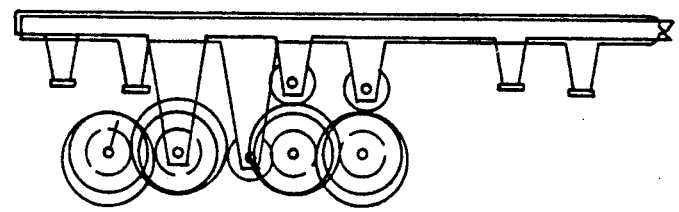
Figure 5U:
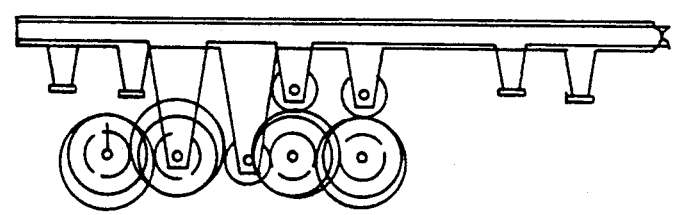
Figure 6:
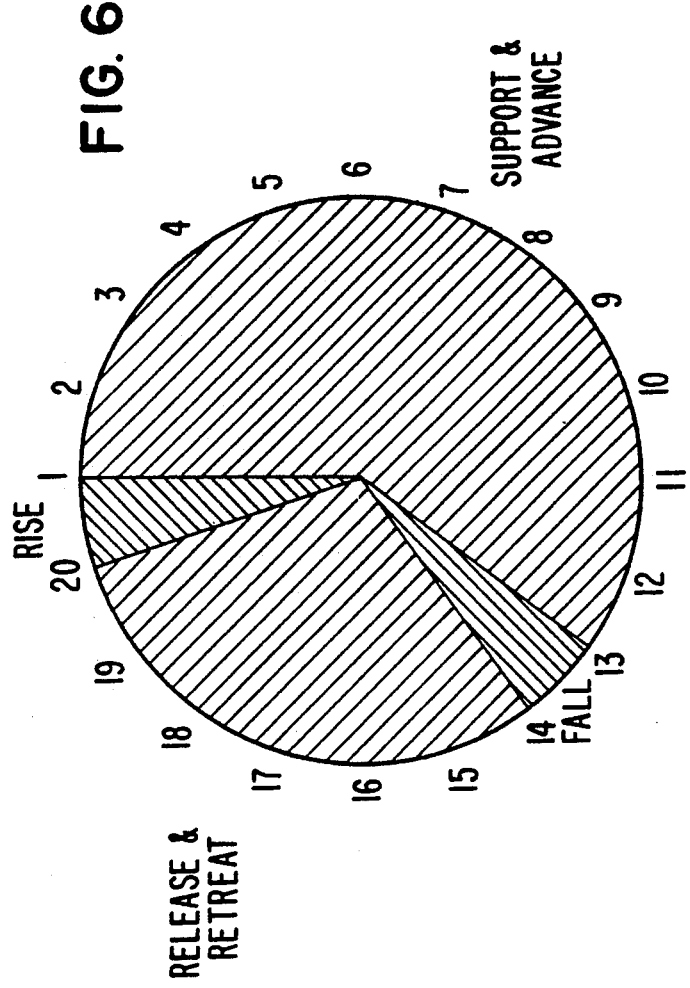
FIG. 6 is a timing diagram for motion travelled.

Finally at stage 4 of FIG. 3, subassembly A has completed its rearward motion and subassembly B has completed its forward motion and corresponds to the position of FIGS. 4n and 5n as described above.

Motion of the subassemblies may be accomplished by various means. The embodiments shown in the figures show cams 11 and followers 9 driven by a motor. Other means such as cranks, pneumatic or hydraulic cylinders, solenoid coils, servomotors, and clutches and levers may also be used. The flexible sheath 21 must be non-particulating, durable, sterile, cleanable, and nontoxic for it to be used in clean room environments or if used in the conveyance of food stuffs, pharmaceuticals, or other materials which require a high degree of cleanliness. A desired flexible sheath is also one which is air permeable and resistant to a wide range of temperatures and is also chemical resistant. A preferred flexible sheath in membrane form is expanded polytetrafluoroethylene (ePTFE) such as that made by W. L. Gore & Associates, Inc. and which is described in and prepared as shown in U.S. Pat. Nos. 3,953,566, and 4,187,390. A membrane such as ePTFE laminated to a backing material to provide additional support and satisfy other mechanical properties may also be employed.

Alternatively, where air flow is not desired, a most preferred flexible sheath membrane is expanded polytetrafluoroethylene, as described above, that has been coated or impregnated with other synthetic substances such as urethane or silicone rubber. Addition of these materials within the membrane renders it more durable over the flexlife of the flexible sheath membrane.

The sheath membrane is bonded to the subassemblies at multiple support points by an adhesive such as acrylic, epoxy, or olefin which provides the desired degree of hardness, flexibility, and strain relief.

Figure 7:
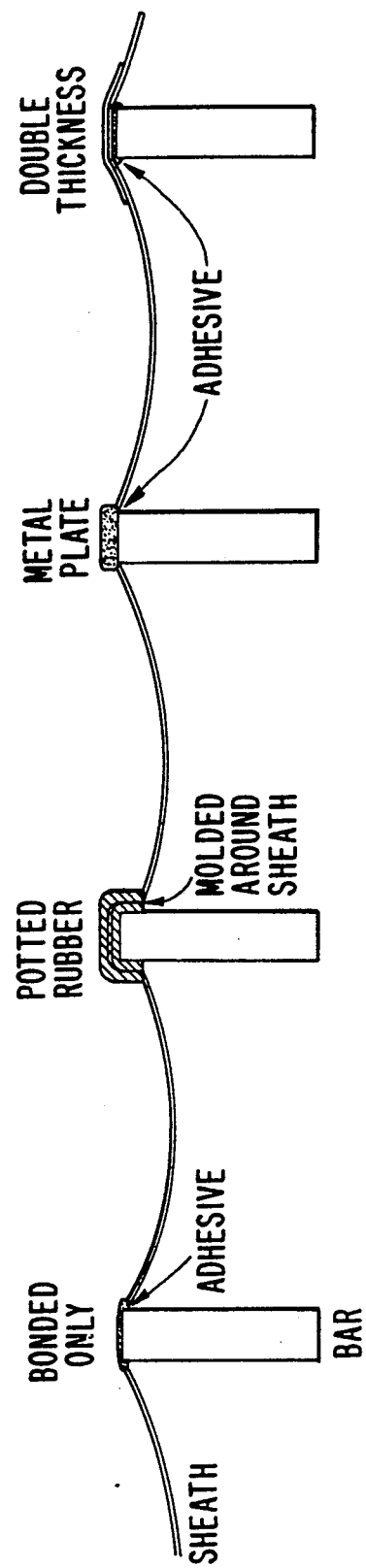
FIG. 7 is a cutaway end view showing examples of means for bonding the flexible sheath membrane to the subassembly bars.

The flexible sheath may also be modified by adding pads or reinforcements, such as small metal plates, potted rubber treads, or regions of double thickness over areas where it is bonded to the subassemblies so that abrasion resistance, coefficient of friction, or electrical conductivity may be different at these bonding points as compared to the other areas of the membrane. Such reinforcements are illustrated in FIG. 7.

Figure 8:
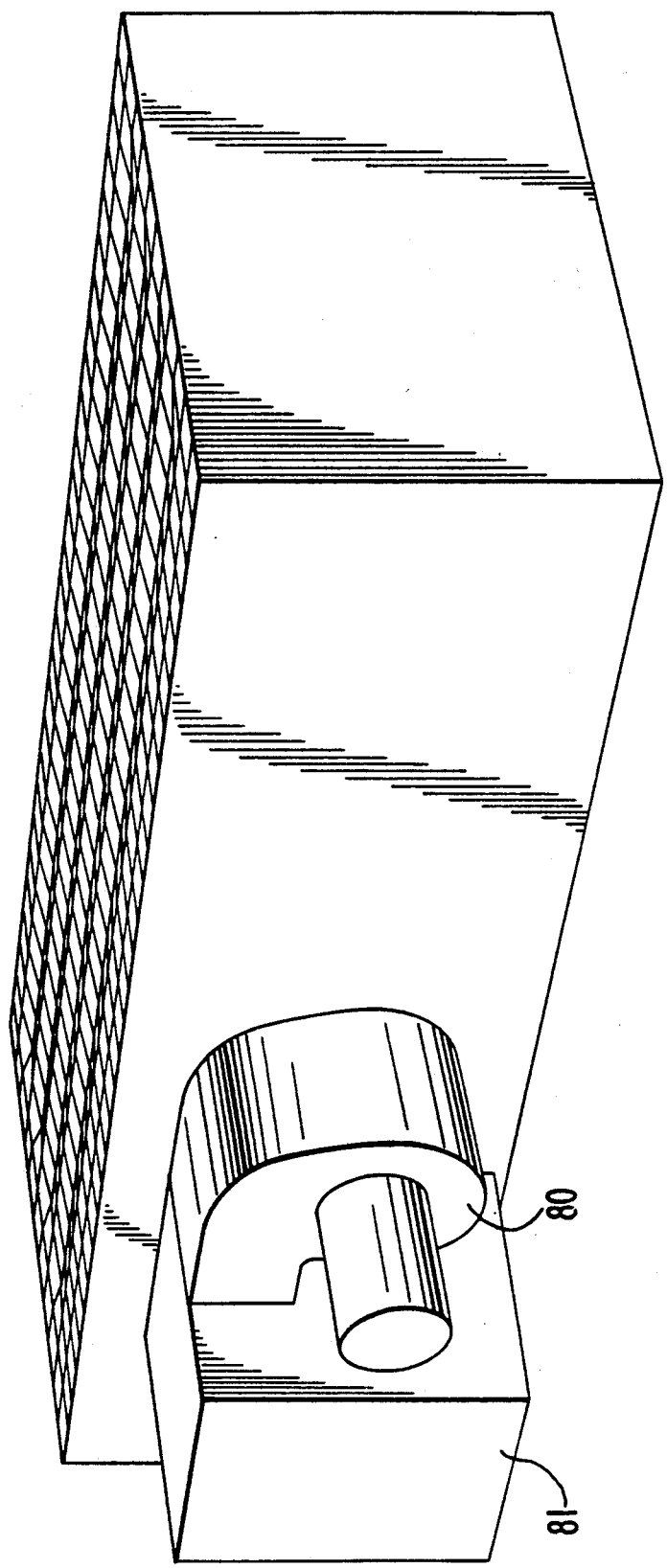
FIG. 8 is a perspective view of the conveyor enclosure with a suction fan attached thereto.
Figure 9:
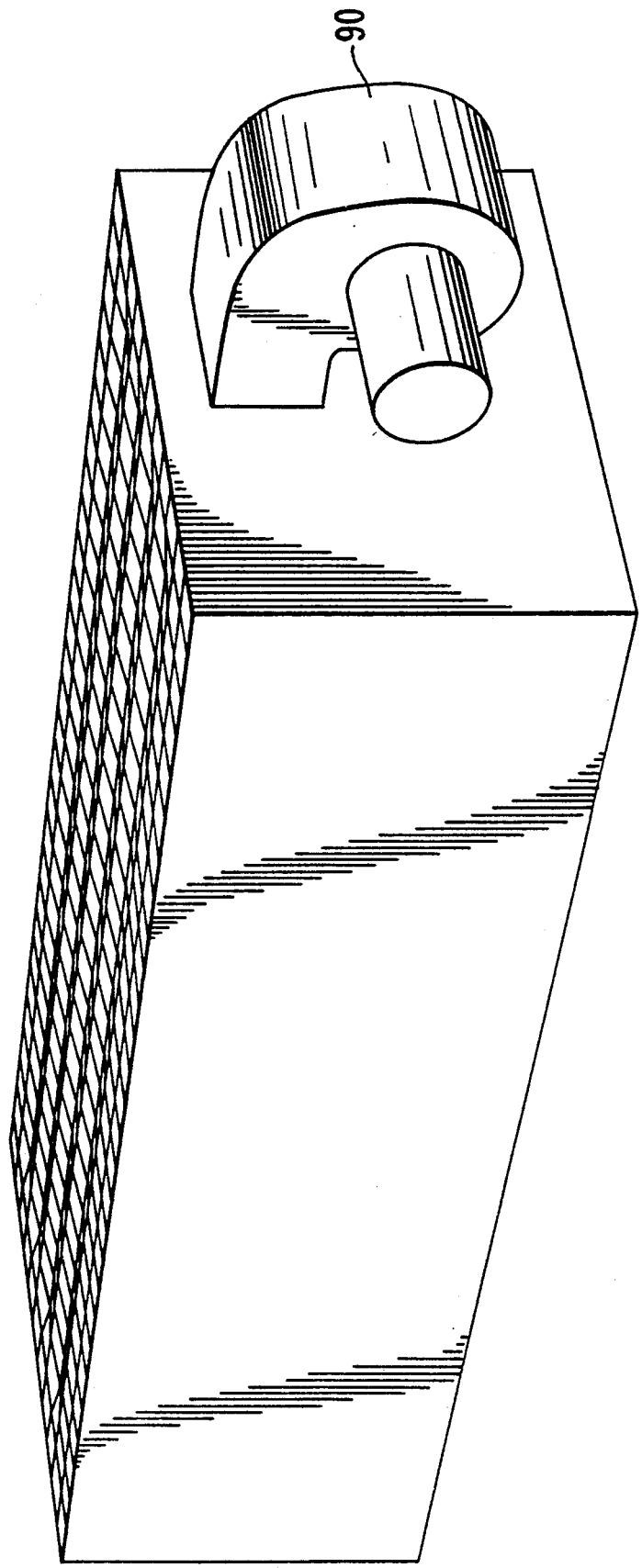
FIG. 9 is a perspective view of the conveyor enclosure with a blower fan attached thereto.

Optional additions to the conveyor system equipped with the air permeable flexible sheath include the use of a suction fan or blower connected to the interior of the conveyor device as shown in FIGS. 8 and 9. When a suction fan 80 is employed as shown in FIG. 8, air may be drawn inward through the air permeable sheath and the subassembly system. The subassemblies would in this case be enclosed in an air impermeable framework. The fan's output is piped elsewhere or through an exhaust filter 81 as shown so that contaminated air does not reenter the environment. The conveyor device thus attracts and carries particles away from the surrounding environment and captures them at the membrane surface thereby removing them from circulation.

When a blower fan 90 of FIG. 9 is employed, the output may be connected to the interior of the conveyor device forcing air outward through the air permeable sheath and subassembly system. The subassembly system should likewise be enclosed in an airtight enclosure. When a blower fan is used such as described, the air permeable sheath serves as a filtering mechanism which removes particulates from the air. The resulting air flow further prevents particles already in the environment from approaching the conveyor and articles being conveyed.

Figure 10:
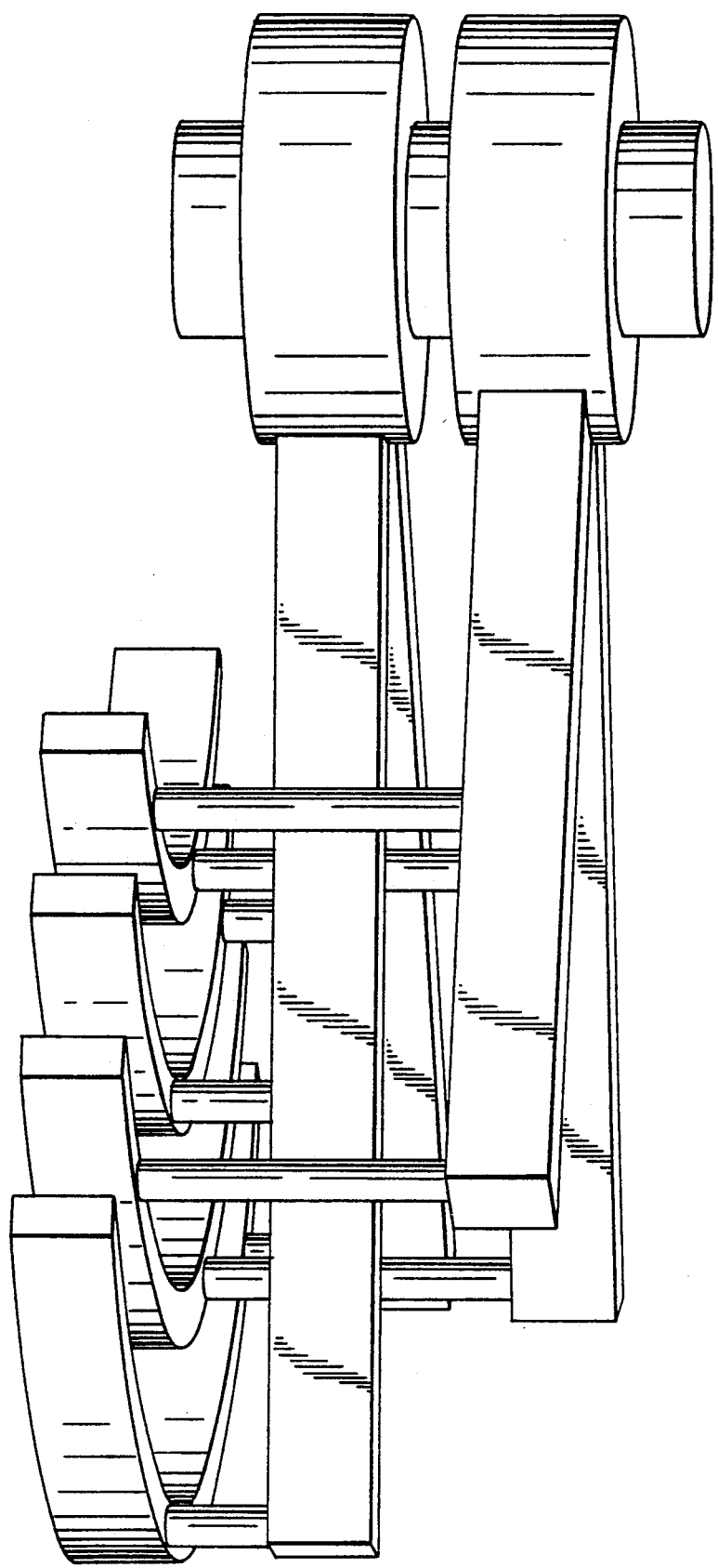
FIG. 10 is a low perspective side view of the subassembly bars designed to move in a circular motion.

The form of the device may be modified to provide for conveying articles in directions other than straight line motion. For example, subassemblies may be combined for rotational motion about a vertical axis with vertical motion rather than the forward and backward motion. In such a situation, the motion of the conveyed article is rotational about the axis as the subassemblies. FIG. 10 shows a low perspective view of the subassemblies of a device providing rotational conveyance around a vertical axis displaced off to the side of the conveyor. Such a device 120 can provide for a 90° turn joining two other straight conveyors 110. Such a combination of systems is shown in top view in FIG. 11.

More complex devices may be built in which different sets of subassemblies may be combined and interleaved where the sets have different functions such as a situation may include where the sets have linear and rotational where one of the sets is raised and operational at any time and where the other set is retracted and not operational (e.g. one set provides linear conveyance and another set placed midway along the conveying distance provides rotation about a central vertical axis). The article may then be conveyed to the mid-point of the system, reoriented and then conveyed to the end of the assembly.

It should be understood that the embodiments described herein are by way of example only and merely illustrative of but a small number of the many possible specific embodiments which can represent applications of principles of the invention. Various changes and modifications obvious to one skilled in the art are deemed to be within the spirit and scope of this invention.

I claim:

1. A mechanical conveyor system comprising:
   (a) a plurality of subassemblies in which each subassembly comprises a series of mutually parallel bars interconnected by perpendicular crossbars and means for providing orbital motion to at least one of the subassemblies in which said subassemblies are interleaved with one another so that the tops of the parallel bars provide a plurality of multiple support points;
   (b) a supporting framework to hold said subassemblies intact;
   (c) an enclosure surrounding the sides of said framework and subassemblies;
   (d) a power source for operating the means for providing motion; and
   (e) a flexible non-linting sheath bonded to said subassemblies at the multiple support points.

2. A mechanical conveyor system as described in claim 1, comprising two subassemblies and means for providing orbital motion to both of the subassemblies.

3. A mechanical conveyor system as described in claim 1, wherein the flexible non-linting sheath is air permeable, temperature resistant and chemical resistant and is selected from the group consisting of membranes and laminates.

4. A mechanical conveyor system as described in claim 1 wherein the flexible non-linting sheath is expanded polytetrafluoroethylene.

5. A mechanical conveyor system as described in claim 4, wherein the expanded polytetrafluoroethylene is reinforced with a polymer selected from the group consisting of urethanes and silicone rubber.

6. A mechanical conveyor system as described in claim 1, wherein the flexible non-linting sheath bonded to the subassemblies at the multiple support points is reinforced at these points by means selected from the group consisting of adhesives, molded potted rubber, metal plates and double thickness of the sheath.

7. A mechanical conveyor system as described in claim 1, wherein the means for providing motion include cams and followers.

8. A mechanical conveyor system as described in claim 3 further comprising a suction fan drawing from the enclosure holding the plurality of subassemblies in which air is drawn inward through the flexible sheath membrane from outside the conveyor system.

9. A mechanical conveyor system as described in claim 3 further comprising a blower blowing into the enclosure holding the plurality of subassemblies in which air is pushed outward through the flexible sheath membrane from inside the conveyor system.

10. A mechanical conveyor system as described in claim 1 comprising subassemblies which provide rotary motion.

11. A mechanical conveyor assembly comprising a combination of a plurality of mechanical conveyor systems wherein each system of the assembly performs a specific function and wherein each system comprises:
    (a) a plurality of subassemblies in which each subassembly comprises a series of mutually parallel bus interconnected by perpendicular crossbars and means for providing orbital motion to at least one of the subassemblies in which said subassemblies are interleaved with one another so that the tops of the parallel bars provide a plurality of multiple support points;
    (b) a supporting frameword to hold said subassemblies intact;
    (c) an enclosure surrounding the sides of said frameword and subassemblies;
    (d) a power source for operating the means for providing motion; and
    (e) a flexible non-linting sheath bonded to said subassemblies at the multiple support points.

* * * * *